Jan. 15, 1952  W. A. BEDFORD, JR  2,582,579
FASTENER
Filed Feb. 5, 1948  2 SHEETS—SHEET 1
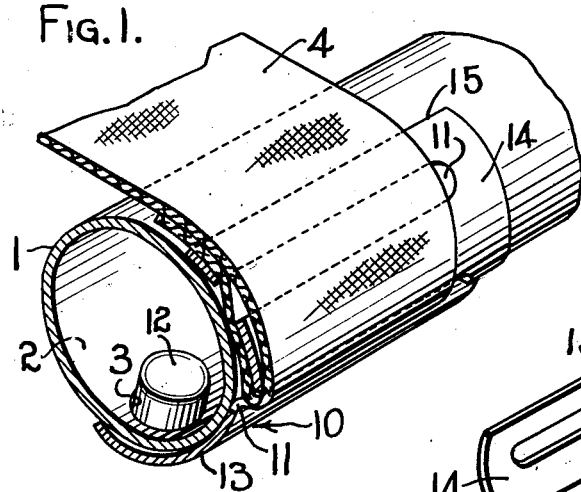
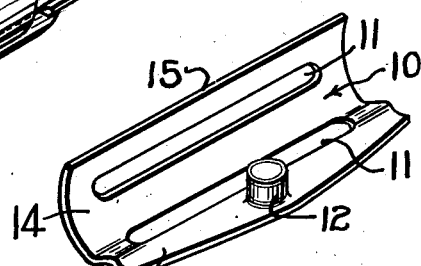
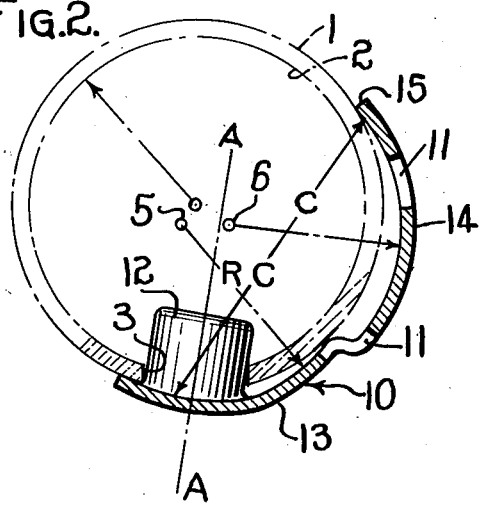
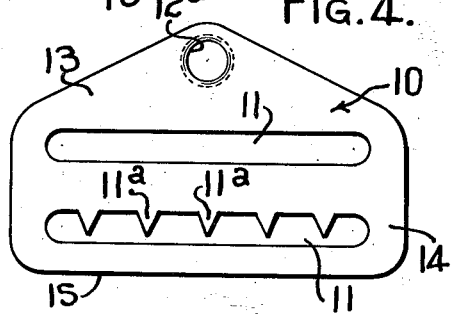
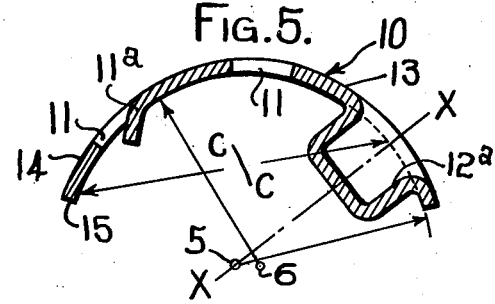
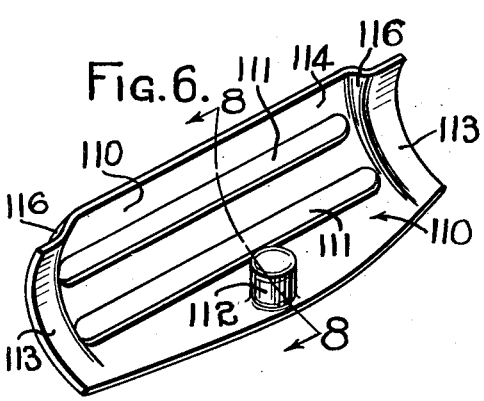
Inventor
WILLIAM A. BEDFORD JR.
By Philip E. Parker
Attorney Jan. 15, 1952  W. A. BEDFORD, JR  2,582,579
FASTENER Filed Feb. 5, 1948  2 SHEETS—SHEET 2

Inventor
WILLIAM A. BEDFORD JR.
By Philip E. Parker
Attorney

Patented Jan. 15, 1952

2,582,579

UNITED STATES PATENT OFFICE 2,582,579

FASTENER

William A. Bedford, Jr., North Scituate, Mass., assignor to United-Carr Fastener Corporation, Cambridge, Mass., a corporation of Massachusetts Application February 5, 1948, Serial No. 6,471

6 Claims. (Cl. 24—73)

1

The present invention relates to improvements in fasteners and more particularly to fasteners adapted to connect a part to be supported to an apertured support, and aims generally to improve fasteners of that type.

A primary object of the invention is the provision of an improved fastener of the buckle type adapted to connect a flexible webbing strip and the like to an apertured support, for example an apertured tubular metal furniture frame.

A further object of the invention is the provision of an improved buckle of the above type which will be simple in construction and will resist strong lateral shear forces.

A still further object of the invention is the provision of an improved fastener that may be readily and quickly snapped into and retained in engagement with an apertured support, and one which may be readily removed from the support when desired.

The above and other objects of the invention will be apparent to persons skilled in the art from a consideration of the accompanying drawings and annexed specification illustrating and describing preferred constructions embodying the invention.

In the drawings:

Fig. 1 is a sectional perspective view of a buckle fastener embodying the invention attached to an apertured support, which conveniently may be a tubular metal furniture frame member;

Fig. 2 is an enlarged transverse sectional view of the fastener shown in Fig. 1, the fastener being shown in shaded lines and the tubular support to which it may be attached is shown in dot and dash lines;

Fig. 3 is a perspective view of the fastener shown in Figs. 1 and 2;

Fig. 4 is a plan view of a buckle blank from which a modified form of fastener may be made;

Fig. 5 is an enlarged transverse sectional view of the fastener shown in Fig. 4;

Fig. 6 is a perspective view of another form of buckle embodying the invention;

Figure 7:
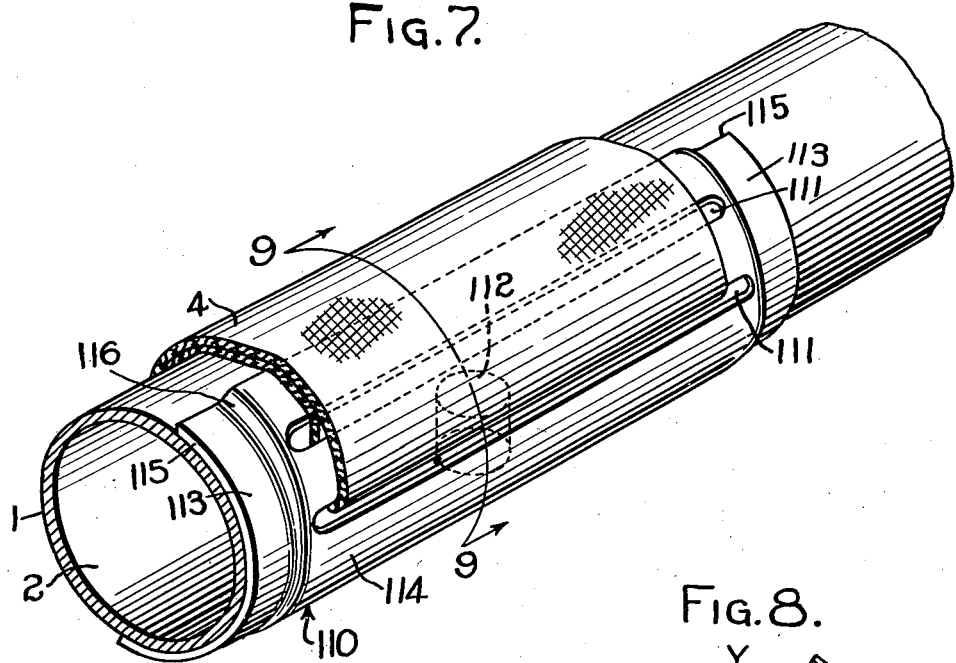
Fig. 7 is a perspective view of the buckle of Fig. 6 attached to an apertured support.

Referring to the drawings, the support 1 may be any desired part having an arcuate fastener-engaging surface 2 provided with a radial aperture 3 through a wall thereof. Desirably, the support 1 is a piece of metal tubing, for example a tubular furniture frame, though it will be

2 understood that other types of support may be suitable for use with the fastener of the invention.

The illustrated embodiment of the invention provides a buckle fastener adapted to be removably and securely attached to the frame and connected to a strip of webbing 4 and the like extending from side to side of the frame and which may form a support for a seat, cushion, mattress and the like.

The fastener of the invention comprises an elongated body, preferably of sheet metal, of generally arcuate transverse cross section, the radii of curvature of which is from spaced centers, one arcuate portion having a support aperture engaging stud which may be obliquely disposed with reference to a radius of curvature of said arcuate portion as passed through the center of said stud.

Referring to Figs. 1, 2 and 3 of the drawings, there is shown a fastener suitable for attaching strip webbing and the like to a tubular support 1, which may be a side member of a tubular metal chair or like frame, and which is provided with an aperture 3 at a desired location preferably in the underside thereof, as shown in Fig. 1.

The fastener comprises an elongated body 10 of resilient sheet material, for example spring steel, and provided with one or more elongated slots 11 through which the strip webbing may be laced as is common with buckles of this type.

The body portion 10 is of transverse arcuate cross section to conform generally to the curvature of the fastener-engaging surface 2 of the support 1 and is provided adjacent one edge with an inwardly extending stud 12 adapted to enter the support aperture 3.

The curvature of the body 10 is preferably composed of separate arcuate sections 13 and 14 constructed on radii having spaced or eccentric centers 5 and 6 (Fig. 2) so that the normal chordal distance C—C between the base of the stud 12 and the opposite free edge 15 of the body section 14 is less than the chord of the support from the center of the aperture 3 to a point on the surface 2 to be engaged by the edge 15. Advantageously this may be effected by curving the portion 13 of the body 10 carrying the stud about the center 5 and curving the opposite portion 14 of the body about an eccentric center 6 as shown in Figs. 2 and 5. Thus, when the body 10 is applied to the support, it is placed under tension, acting to pull the stud 12 laterally against the side wall of the aperture 3 and lock the fastener securely to the support 1.

Preferably the stud 12 is inclined toward the end 15 and is disposed on an axis oblique to a radius of the stud-carrying part 13, for example the axis A—A, Fig. 2. Thus, the normal distance between the inner end of the stud and the end 15 is substantially less than the distance between the end 15 and an adjacent wall of the aperture 3 in which the stud is entered. This construction permits of securing the fastener in place on the tubular support 1 by a snap fastener action and is particularly strong and resistant to shear forces applied to the part 14.

The fastener body 10 may be outwardly distorted or bent, intermediate the support engaging portions 13 and 14, as shown in Figs. 1 and 2, and the supported part-receiving fastener. Such fastener may be of any type suitable for engaging and supporting the part to be supported. As herein shown, such fastener part comprises spaced slots 11 providing a buckle through which the web 4 and the like may be woven or laced as will be clearly understood in the art.

In Figs. 4 and 5 there is illustrated a modified form of the invention constructed of a single piece of metal in which the portions 13 and 14 are curved about spaced centers 5 and 6, as above described. The inwardly extending stud 12ª advantageously may be pressed or drawn integrally from the support-engaging surface 13 and its axis X—X is preferably oblique to a radius of the porton 13. One or more of the edges of the slots 11 may be provided with teeth 11ª to grip the part 4 to be supported, particularly when such part is in the form of a fabric web strip or the like.

Figure 8:
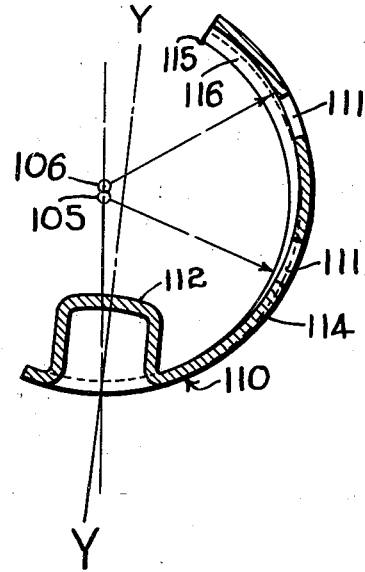
Fig. 8 is a sectional view of the buckle on line 8—8 of Fig. 6.
Figure 9:
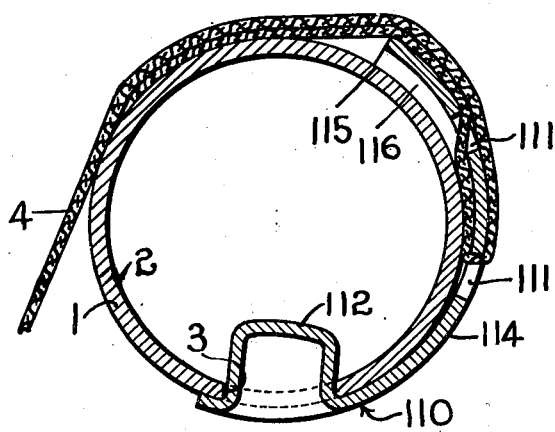
Fig. 9 is a sectional view of the buckle attached to an apertured support on line 9—9 of Fig. 7.

In Figs. 6, 7, 8 and 9 there is illustrated another modified form of the invention constructed of a single piece of metal with a body 110 with a central portion 114 curved about a center 106 and end portions 113 curved about another center 105. The centers 105 and 106 are spaced apart and so positioned that on one side of the body the inner surfaces of the end portions and central portion are flush, while toward the other side the inner surface of the central portion becomes increasingly displaced outwardly from the inner surface of the end portions. Connecting portions 116 join the outwardly displaced central portion to the adjacent end portions 113. The inwardly extending stud 112 may be pressed or drawn integrally from the central portion 114 adjacent the side that is flush with the end portions and may have its axis Y—Y inclined obliquely to a radius of the end portion 113 and inwardly toward the other side of the central portion 114. In the displaced side of the central portion 114, one or more longitudinal slots 111 may be disposed for securing a fabric web 4. The above described construction results in the distance from the edge 115 of the end portion 113 to the surface of the base of stud 112 being greater than the distance from the edge 115 to the top of the stud. Consequently, the fastener may be placed on the support 1 with a snap fastener action with the stud 112 snapping into the aperture 3 and the interior surfaces adjacent the edges 115 engaging the exterior surface of the support.

Important advantages of the invention reside in the simplicity of construction and strength of the fastener. It will be apparent that the fastener may be secured to the tubular or cylindrical support by a snap fastener action due to the fact that the head of the stud is nearer the edge 15 than is the base of the stud. Thus, as the fastener is applied to a tubular support with the stud 12 entering into the aperture 3, the end edge 15 will yield outwardly under tension permitting the stud to be fully inserted within the aperture 3, and causing the stud thereafter to grip opposing sides of the radial aperture of a tubular part under tension.

When the portion 14 of the fastener is under load, the support-engaging portion 13 is retained in engagement with the tubular support 1 by reason of the oblique disposition of the stud 12 with reference to any radius of the portion 13.

It will be apparent to persons skilled in the art that other types of part-engaging fasteners may be employed and that the invention is not to be restricted to the buckle type herein shown and described. The scope of the invention is best defined in the appended claims.

I claim:

1. A fastener member for attachment to a support having an arcuate apertured fastener-engaging surface comprising an elongated curved body of resilient sheet material having a concave support-engaging surface, the curvatures of different portions of which are generated about spaced centers whereby said portions are eccentrically disposed with relation to each other, means connecting said eccentrically disposed portions in laterally offset relationship such that an intermediate portion of said body is normally spaced outwardly from the arcuate surface of a support when the fastener is assembled therewith, a rigid tubular stud member connected to one of said portions adjacent a side of said fastener member and extending inwardly from the concave face thereof for cooperation with a support aperture, said stud member being so disposed with reference to said eccentrically disposed surfaces that the axis thereof extends obliquely to the axis of the support aperture when the fastener is assembled with the support thus effecting tensional engagement of the stud with the walls of said aperture at diametrically opposite sides of the stud, the portion of said body normally spaced outwardly from the surface of a support being provided with means to engage a part to be supported whereby a pull on said part will urge the body into tighter engagement with the surface of the support.

2. A fastener member of the type set forth in claim 1 in which the axis of said tubular stud member is inclined inwardly toward the end of said fastener member at an oblique angle to a radius of said curved body which intersects said stud axis at the outer surface of said curved body.

3. A fastener member of the type set forth in claim 1 in which the means connecting said eccentrically disposed laterally offset portions comprises an outwardly bent portion of said body intermediate the sides thereof.

4. A fastener member of the type set forth in claim 1 in which said eccentrically disposed laterally offset portions comprise oppositely disposed support-engaging end portions connected to an intermediate outwardly offset portion, said end and offset portions merging adjacent the side of the said fastener member to which the stud member is connected.

5. A fastener for attachment to a cylindrical tubular support having a radial aperture in a wall thereof, comprising a substantially arcuate shaped body of resilient material having support-engaging curved surfaces at opposite ends thereof, an intermediate curved surface disposed between said support-engaging surfaces substantially flush with said support-engaging surfaces at one side edge of said body but displaced outwardly from said curved surfaces at the other side of said body, and a rigid stud member extending inwardly from said intermediate surface adjacent said one side edge with its axis extending obliquely to radii of said curved end surfaces, said intermediate surface having means to engage a part to be supported.

6. A fastener for attachment to a cylindrical tubular support having a radial aperture in a wall thereof, comprising a substantially arcuate shaped body of resilient material having opposed end portions with support-engaging surfaces generated about a first axis and a central portion with an inner surface generated about a second axis displaced from said first axis having one side thereof substantially flush with said end portions and the other side displaced outwardly from said portions, a rigid stud member extending inwardly from said inner surface of said central portion adjacent said one side and having its axis oblique to a line from said first axis which passes through the center of the base of said stud.

WILLIAM A. BEDFORD, Jr.

REFERENCES CITED

The following references are of record in the file of this patent:

UNITED STATES PATENTS

| Number | Name | Date |
|---|---|---|
| 1,142,842 | Rehm | June 15, 1915 |
| 1,860,170 | Bronson | May 24, 1932 |
| 1,878,048 | Wheeler | Sept. 20, 1932 |
| 2,474,158 | Neely | June 21, 1949 |